United States Patent
Griffin (10) Patent No.: US 9,568,129 B2
(45) Date of Patent: Feb. 14, 2017

(54) METHOD AND APPARATUS FOR RETAINING A FLANGE ON A FLUID METER

(75) Inventor: Clinton Ray Griffin, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 290 days.

(21) Appl. No.: 14/366,076

(22) PCT Filed: Jan. 3, 2012

(86) PCT No.: PCT/US2012/020064
§ 371 (c)(1),
(2), (4) Date: Jun. 17, 2014

(87) PCT Pub. No.: WO2013/103336
PCT Pub. Date: Jul. 11, 2013

(65) Prior Publication Data
US 2015/0001846 A1 Jan. 1, 2015

(51) Int. Cl.
*F16L 23/00* (2006.01)
*F16L 23/02* (2006.01)
*G01F 15/18* (2006.01)
*F16L 23/028* (2006.01)

(52) U.S. Cl.
CPC ............ *F16L 23/02* (2013.01); *F16L 23/0286* (2013.01); *G01F 15/185* (2013.01); *Y10T 29/49826* (2015.01); *Y10T 29/49947* (2015.01)

(58) Field of Classification Search
USPC ....................................... 285/412, 415, 414
See application file for complete search history.

(56) References Cited

U.S. PATENT DOCUMENTS

| 944,877 | A | * | 12/1909 | Koshchinski | ....... F16L 19/0206 285/332.4 |
| 2,230,286 | A | * | 2/1941 | Cotner | ..................... F16J 10/00 220/327 |
| 2,569,333 | A | | 9/1951 | Peterson | |
| 3,085,820 | A | * | 4/1963 | Pollia | ...................... F16L 23/02 267/167 |
| 3,439,844 | A | * | 4/1969 | Johnston | .............. B67D 1/0832 222/398 |
| 3,455,583 | A | * | 7/1969 | Ray | ..................... F16L 23/0286 285/106 |

(Continued)

FOREIGN PATENT DOCUMENTS

| CN | 101128721 A | 2/2008 |
| EP | 1909017 A1 | 4/2008 |

(Continued)

*Primary Examiner* — Aaron Dunwoody
(74) *Attorney, Agent, or Firm* — The Ollila Law Group LLC (57) ABSTRACT

A sensor assembly (5) for a fluid meter (100) is provided. The sensor assembly (5) comprises a sensor assembly body (6) and one or more circumferential grooves (303) formed in the sensor assembly body (6). Two or more retaining components (105, 106) are removably coupled together around at least one of the one or more circumferential grooves (303) with a portion of the two or more retaining components engaging the circumferential groove. A flange (104) is also provided that surrounds at least a portion of the sensor assembly body (6) and is retained around the sensor assembly body (6) by the first and second retaining components (105, 106).

12 Claims, 6 Drawing Sheets

(56) References Cited

U.S. PATENT DOCUMENTS

| | | | | |
|---|---|---|---|---|
| 3,966,234 | A * | 6/1976 | Sundholm | F16L 23/0286 285/24 |
| 4,448,448 | A * | 5/1984 | Pollia | F16L 23/18 285/112 |
| 4,767,138 | A | 8/1988 | Schafbuch | |
| 5,782,500 | A * | 7/1998 | Mate | F16L 19/02 285/24 |
| 7,604,217 | B2 * | 10/2009 | Lum | F16K 5/0626 251/148 |
| 7,712,797 | B2 * | 5/2010 | Lum | F16K 5/0626 285/368 |
| 2005/0146139 | A1 * | 7/2005 | Huybrechts | F16L 23/0286 285/368 |
| 2005/0225089 | A1 * | 10/2005 | Ben-Horin | F16L 23/0286 285/414 |
| 2006/0201260 | A1 | 9/2006 | Drahm et al. | |
| 2015/0260320 | A1 * | 9/2015 | Huang | F16L 23/00 285/414 |

FOREIGN PATENT DOCUMENTS

| | | |
|---|---|---|
| JP | 60-030885 A | 2/1985 |
| WO | 0102813 A1 | 11/2001 |
| WO | 2006089855 A1 | 8/2006 |
| WO | 2008050150 A1 | 5/2008 |

\* cited by examiner

METHOD AND APPARATUS FOR RETAINING A FLANGE ON A FLUID METER

TECHNICAL FIELD

The embodiments described below relate to, fluid meters, and more particularly, to a method and apparatus for retaining a flange on a fluid meter.

BACKGROUND OF THE INVENTION

Fluid meters, such as Coriolis flow meters, vibrating densitometers, piezoelectric flow meters, etc. typically include one or more tubes for containing a fluid. The fluid may be flowing such as in a Coriolis flow meter or stationary such as in a vibrating densitometer. The fluid may comprise a liquid, a gas, or a combination thereof. In some situations, the fluid may include suspended particulates. Typically, the fluid tubes are enclosed in a case in order to protect the tubes and associated electrical components as well as provide a more stable environment.

In many situations, a portion of the fluid tubes extend out of the case and are joined to a pipeline interface, such as a manifold. The fluid tubes are generally joined to the manifold by welding. The manifolds are then typically brazed to case ends in a vacuum brazing operation. Once the appropriate electrical sensors are attached to the fluid tubes, the case ends are then welded to the case. Flanges are then generally welded to the case ends or the manifold in order to subsequently couple the fluid meter to the pipeline carrying a process fluid.

Obtaining adequate and reliable connections between the various components is often a problem with prior art fluid meters. One reason is due to thermal expansion of the materials used for the various components of the fluid meter. As the components are being coupled to one another, high temperatures are often involved, which can result in significant changes in the components' dimensions. This is especially true when the various components comprise metals that are coupled by welding, brazing, soldering, etc., which can require an excessive amount of heat. While this may not create a problem if all of the components are formed from the same material or materials with similar coefficients of thermal expansion as the components will expand and contract in unison, this is not always feasible. In many situations, the fluid tubes are formed from a different material than the case, the case ends, and the flanges. For example, when the process fluid in the fluid meter comprises a highly corrosive fluid, the fluid tubes need to be formed from a material that is highly corrosion resistant, such as titanium, tantalum, or zirconium. Similarly, any other portion of the wetted path should also be formed from high corrosion resistant materials. For example, in a dual fluid tube meter, the manifold is included in the wetted fluid path. Therefore, the manifold would also need to be formed from a highly corrosion resistant material. While the case, the case ends, and the flanges would ideally be formed from the same material as the fluid tubes and the manifold, such an approach is typically cost prohibitive as titanium, tantalum, and zirconium are expensive metals. Therefore, portions of the fluid meter that are not in contact with the fluid are generally made from less expensive materials, such as stainless steel.

Although the different materials used to form the fluid meter may not be a problem when the fluid meter is at or near a predetermined temperature, such as room temperature, the differences in their coefficients of thermal expansion can create serious manufacturing problems as various portions of the meter are subjected to extreme temperature variations. A similar problem can be experienced in situations where the fluid is at an extreme temperature compared to the surrounding environment resulting in the wetted fluid path being subjected to a much higher temperature. The embodiments described below overcome these and other problems and an advance in the art is achieved. The embodiments described below provide an improved fluid meter that can combine various components having differing coefficients of thermal expansion without the above-mentioned drawbacks.

SUMMARY OF THE INVENTION

A sensor assembly for a fluid meter is provided according to an embodiment. The sensor assembly comprises a sensor assembly body and one or more circumferential grooves formed in the sensor assembly body. According to an embodiment, two or more retaining components are removably coupled together and engage at least one of the one or more circumferential grooves. According to an embodiment, a flange surrounds at least a portion of the sensor assembly body and is retained around the sensor assembly body by the first and second retaining components.

A method for retaining a flange on a sensor assembly is provided according to an embodiment. The method comprises a step of positioning the flange around a portion of a sensor assembly body such that the flange is located closer to a mid-portion of the sensor assembly body than a circumferential groove formed in the sensor assembly body. According to an embodiment, the method further comprises removably coupling two or more retaining components around the circumferential groove to provide an outer diameter of a ring that is larger than at least a portion of an inner diameter of the flange, thereby preventing the flange from moving past the two or more retaining components.

Aspects

According to an aspect, a sensor assembly for a fluid meter comprises:
a sensor assembly body;
one or more circumferential grooves formed in the sensor assembly body;
two or more retaining components removably coupled together and engaging at least one of the one or more circumferential grooves; and
a flange surrounding at least a portion of the sensor assembly body and retained around the sensor assembly body by the first and second retaining components.

Preferably, the flange comprises a step extending from an inner surface with a portion of the inner surface extending over the two or more retaining components and the step abutting the two or more retaining components.

Preferably, the sensor assembly body comprises a case, a pipeline interface, and a transition ring coupling the pipeline interface to the case.

Preferably, the one or more circumferential grooves are formed in the transition ring.

Preferably, the sensor assembly further comprises an O-ring groove formed in a face of the pipeline interface.

Preferably, each of the two or more retaining components includes a lip sized and shaped to be received by the circumferential groove.

Preferably, the sensor assembly further comprises one or more mechanical fasteners engaging the two or more retaining components to couple the two or more retaining components to one another.

According to another aspect, a method for retaining a flange on a sensor assembly comprises steps of:

positioning the flange around a portion of a sensor assembly body such that the flange is located closer to a mid-portion of the sensor assembly body than a circumferential groove formed in the sensor assembly body; and removably coupling two or more retaining components around the circumferential groove to provide an outer diameter of a ring that is larger than at least a portion of an inner diameter of the flange, thereby preventing the flange from moving past the two or more retaining components.

Preferably, the flange comprises a step extending from an inner surface with a portion of the inner surface extending over the two or more retaining components and the step abutting the two or more retaining components.

Preferably, the sensor assembly body comprises a case, a pipeline interface, and a transition ring coupling the pipeline interface to the case.

Preferably, the circumferential groove is formed in the transition ring.

Preferably, the pipeline interface comprises an O-ring groove.

Preferably, each of the two or more retaining components includes a lip sized and shaped to be received by the circumferential groove.

Preferably, the step of removably coupling the two or more retaining components comprises engaging one or more mechanical fasteners with one more fastener apertures formed in the two or more retaining components.

DETAILED DESCRIPTION OF THE INVENTION

FIGS. 1-6 and the following description depict specific examples to teach those skilled in the art how to make and use the best mode of embodiments of a flow meter. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the flow meter. As a result, the embodiments described below are not limited to the specific examples described below, but only by the claims and their equivalents.

Figure 1:
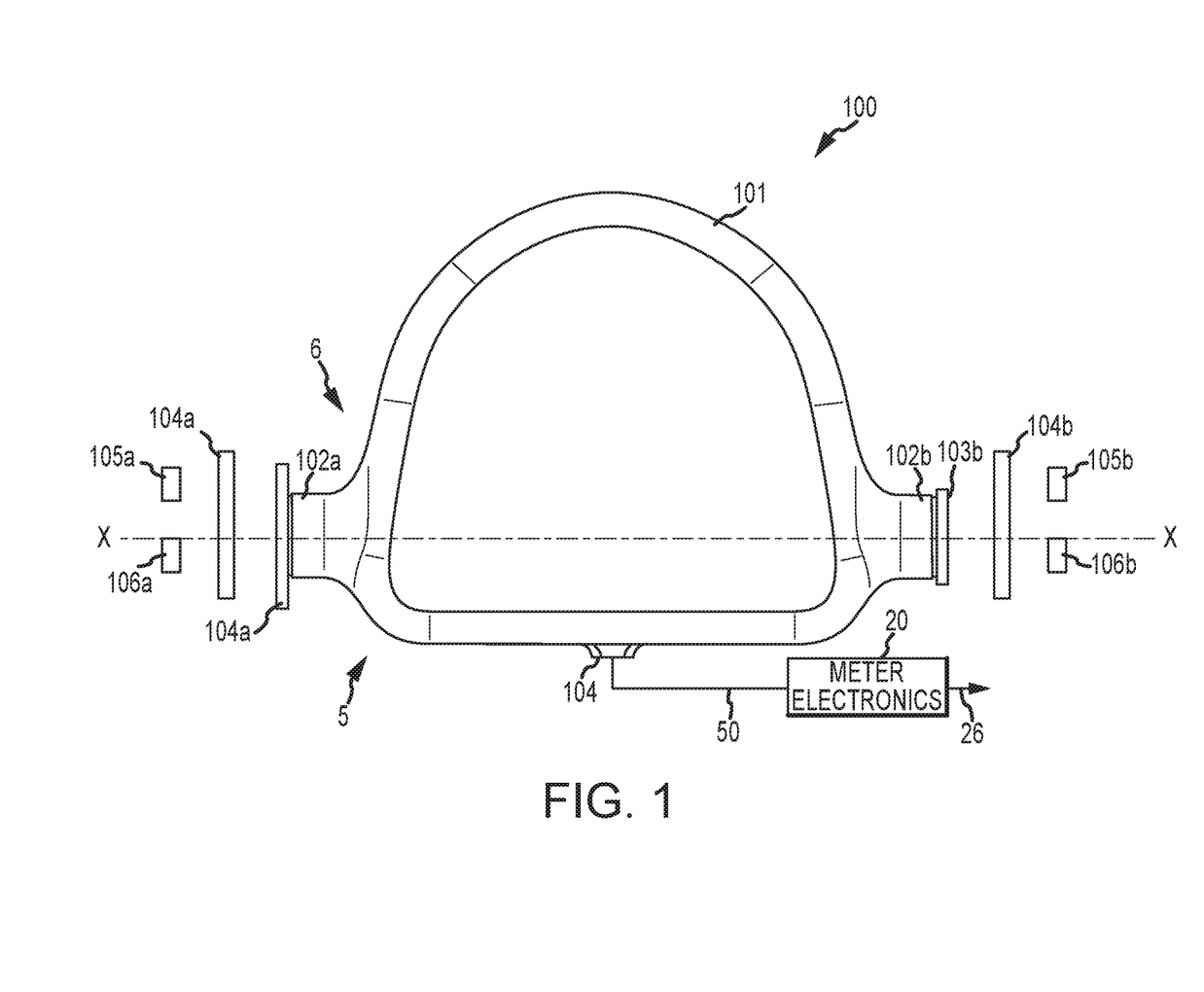
FIG. 1 shows a fluid meter according to an embodiment.

FIG. 1 shows a fluid meter 100 according to an embodiment. The fluid meter 100 comprises a sensor assembly 5 and a meter electronics 20. The sensor assembly 5 comprises a sensor assembly body 6, which comprises a case 101, a first transition ring 102a, a second transition ring 102b, a first pipeline interface 103a (See FIG. 5), and a second pipeline interface 103b. The fluid meter 100 further includes a first flange 104a, which is shown retained on the sensor assembly 5 and a second flange 104b, which is shown free from the sensor assembly 5. The flanges 104a, 104b can be retained to the sensor assembly 5 using first and second retaining components 105a, 106a (See FIGS. 5) and 105b, 106b, respectively.

Within the sensor assembly body 6, the fluid meter 100 can include conventional components such as one or more fluid tubes (See FIG. 5) and suitable sensor components such as a driver, and one or more pick-off components. These components are generally known in the art and therefore, a discussion of the prior art components is omitted from the description for the sake of brevity. The case 101 includes a feed-thru 104 for electrical leads 50 that connect the sensor components to the meter electronics 20. A path 26 can provide an input and an output means that allows one or more meter electronics 20 to interface with an operator. The meter electronics 20 may interface with an operator using wire leads or some type of wireless communication interface, for example. The meter electronics 20 can measure one or more characteristics of the fluid under test such as, for example, a phase difference, a frequency, a time delay (phase difference divided by frequency), a density, a mass flow rate, a volumetric flow rate, a totalized mass flow, a temperature, a meter verification, and other information as is generally known in the art.

These features are generally known in the fluid meter industry and do not comprise a portion of the claimed embodiments. Thus, a discussion of the particular operation of fluid meters and the meter electronics is omitted for brevity of the description.

Figure 2:
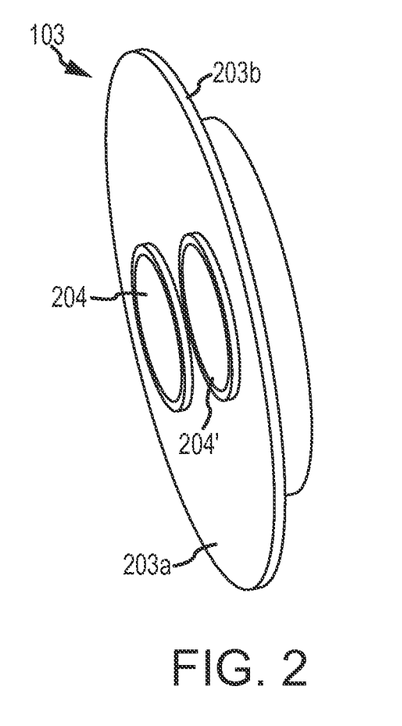
FIG. 2 shows a manifold according to an embodiment.

FIG. 2 shows a pipeline interface 103 according to an embodiment. The pipeline interface 103 may comprise the first or the second pipeline interface 103a, 103b as both interfaces are substantially the same. In the embodiment shown, the pipeline interface 103 includes a first face 203a and a second face 203b, generally opposite the first face 203a. According to an embodiment, the first face 203a is exposed to a coupled pipeline (not shown). As can be appreciated, in high corrosion environments, the pipeline interface 103 should preferably be formed from a material having a high corrosion resistance. In many embodiments, the pipeline interface 103 is formed from the same material as the fluid tubes 504, 504' (See FIG. 5).

According to the embodiment shown, the pipeline interface 103 comprises a manifold that separates a single fluid stream into two or more fluid streams. Therefore, the pipeline interface 103 shown may be utilized in dual tube meters, for example. The pipeline interface 103 therefore includes first and second fluid tube apertures 204, 204'. The first and second fluid tube apertures 204, 204' can be sized and located to receive two fluid tubes (See FIG. 5). Therefore, the first and second fluid tube apertures 204, 204' can receive a single fluid stream from the connected pipeline and separate the fluid between the two fluid tube apertures 204, 204'. Although the present embodiment shows two fluid tube apertures 204, 204', in other embodiments, more than two fluid tube apertures may be provided to split the fluid into more than two fluid streams. Alternatively, the pipeline interface 103 may comprise a single fluid tube aperture, such as in a single tube meter. The pipeline interface 103 is shown separating the flow between two fluid tube apertures 204, 204' in the embodiments shown and thus, the remainder of the description refers to the pipeline interface 103 as a manifold 103.

Figure 3:
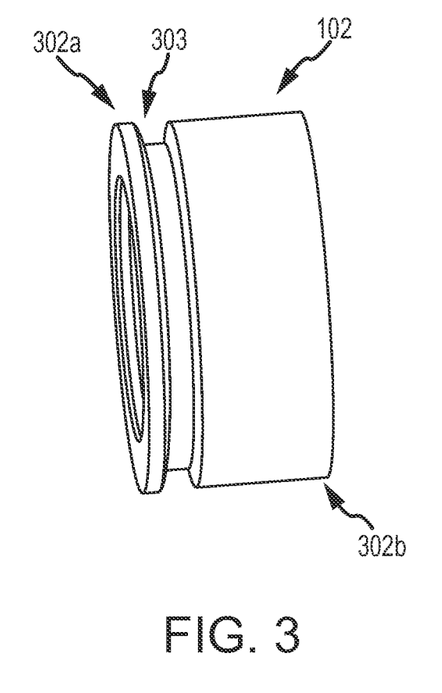
FIG. 3 shows a transition ring for coupling a case to a pipeline interface according to an embodiment.

FIG. 3 shows a transition ring 102 according to an embodiment. The transition ring 102 may comprise the first transition ring 102a shown in FIG. 1 or the second transition ring 102b shown in FIG. 1 as the transition rings are substantially the same. The transition ring 102 is configured to be coupled to the pipeline interface 103 at a first end 302a and to the case 101 at a second end 302b. Therefore, the transition ring 102 can couple two dissimilar metals of a sensor assembly 5. According to an embodiment, the transition ring 102 includes a circumferential groove 303 proximate the first end 302a. The circumferential groove 303 is provided to receive at least a portion of the first and second retaining components 105, 106 as is discussed in more detail below. Although the circumferential groove 303 is shown as extending substantially entirely around the circumference of the transition ring 102, in other embodiments, the circumferential groove 303 may only extend partially around the transition ring 102. Therefore, the description and claims should not be limited to requiring the groove 303 to extend completely around the transition ring 102. Furthermore, while only a single groove 303 is shown, in other embodiments, more than one groove may be provided at each end of the sensor assembly 5.

Figure 4:
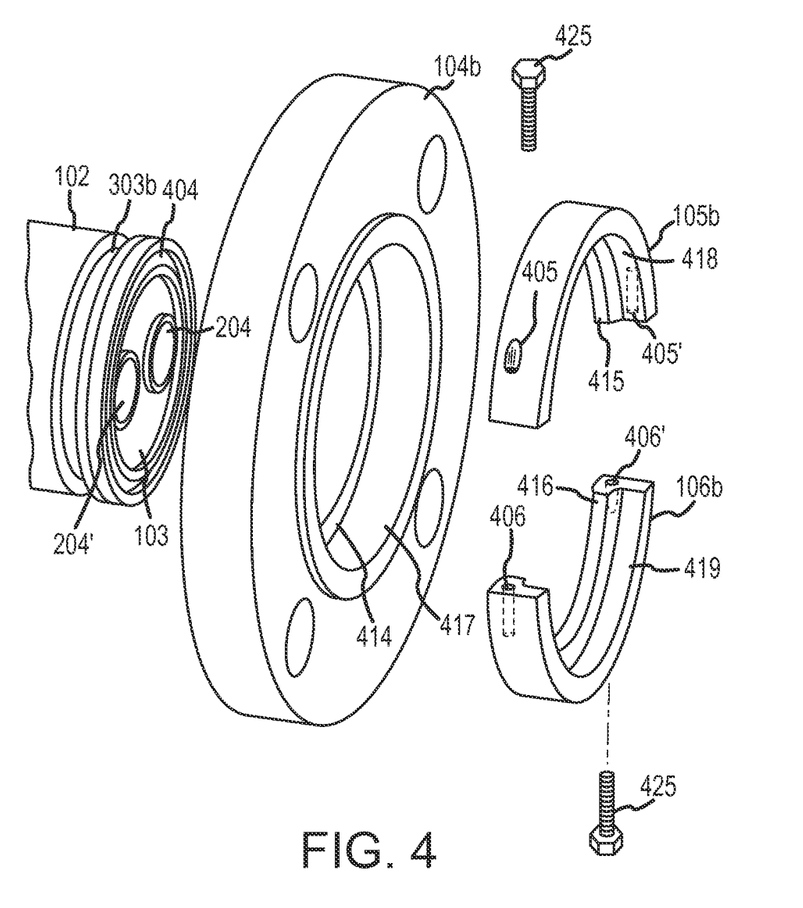
FIG. 4 shows an exploded view of one end of the sensor assembly according to an embodiment.

FIG. 4 shows a closer view of the second end of the sensor assembly 5. According to the embodiment shown in FIG. 4, the flange 104b is not yet retained on the sensor assembly 5. As shown, the first and second retaining components 105b, 106b are separated from one another. According to an embodiment, the first and second retaining components 105a, 105b can be separated from one another to remove the flange 104b from the sensor assembly 5. As shown, the first and second retaining components 105b, 106b can comprise substantially arcuate shapes that when joined together form at least part of a ring. It should be appreciated that while only two retaining components 105b, 106b are shown, in other embodiments, more than two retaining components can be provided. For example, while each of the first and second retaining components 105b, 106b shown in FIG. 4 comprise approximately half of the completed ring, if three retaining components were provided, each of the retaining components could comprise approximately ⅓ of the completed ring. Therefore, the description and claims should not be limited to two retaining components. It should be appreciated however, that in some embodiments, the retaining components may include spaces between adjacent retaining components. Therefore, the description and claims should not require a continuous ring to be formed when the two or more retaining components are coupled together.

According to an embodiment, the first retaining component 105b comprises one or more fastener apertures 405, 405'. The fastener aperture 405' is shown in dashed lines in FIG. 4 because it is actually enclosed in the retaining component and would not otherwise be visible in FIG. 4. According to an embodiment, the second retaining component 106b comprises one or more corresponding fastener apertures 406, 406'. It should be appreciated that the fastener apertures 405, 406 can be aligned with one another while the fastener apertures 405', 406' can likewise be aligned with one another. Once the fastener apertures are aligned, the first and second retaining components 105, 106 can be brought together and a mechanical fastener 425 can be received by each of the fastener apertures 405, 405', 406, 406' to couple the first and second retaining components 105, 106 to one another. For example, the mechanical fastener 425 may comprise a bolt, screw, nail, etc. In embodiments where the mechanical fastener 425 comprises a bolt or a screw, the fastener apertures 405, 406 can be threaded. It should be appreciated that while the first and second retaining components 105, 106 can be coupled using methods other than mechanical fasteners, such as adhesives, brazing, bonding, welding, etc., the mechanical coupling of the first and second retaining components 105, 106 improves upon prior art flange retainers, such as split rings, which can easily be inadvertently expanded over the circumferential groove 303 thereby allowing the flange to accidentally slip off. In contrast, the mechanical coupling between the first and second retaining components 105, 106 provides a secure system for retaining the flange 104 on the sensor assembly 5 of the fluid meter 100. However, unlike adhesives, brazing, welding, etc., which provide a substantially permanent coupling, the mechanical fasteners 425 can be removed to replace the flanges 104a, 104b.

According to an embodiment, the first and second retaining components 105, 106 include lips 415, 416. The lips 415, 416 extend inward from interior surfaces 418, 419 of the retaining components 105, 106. The lips 415, 416 are sized and shaped to engage the circumferential groove 303 formed in the transition ring 102. Therefore, the engagement of the lips 415, 416 with the circumferential groove 303b can restrict movement of the retaining components 105, 106. According to an embodiment, the lips 415, 416 can be disengaged from the circumferential groove 303b by separating the first and second retaining components 105b, 106b from one another and lifting the lips 415, 416 out of the circumferential groove 303b. Although each of the first and second retaining components 105, 106 is shown with only one lip 415, 416, in other embodiments, more than one lip may be provided. For example, if more than one groove is provided, the retaining components may include more than one lip such that multiple grooves can be engaged simultaneously.

In the embodiment shown in FIG. 4, the flange 104b is also shown with a step 414. According to an embodiment, the step 414 extends inward from the generally circular interior surface 417 of the flange 104b resulting in the flange having two different inner diameter sizes. Although the step 414 is sized large enough to fit over the transition ring 102, the step 414 is generally smaller than the outer diameter of the first and second retaining components 105, 106, when coupled together. Therefore, the step 414 limits movement of the flange 104b as discussed in greater detail below. It should be appreciated that in alternative embodiments, the step 414 may be omitted and the circular interior surface 417 may be sized smaller than the outer diameter of the first and second retaining components 105, 106. In this alternative embodiment, the flange 104b would not receive any portion of the retaining components 105, 106, but rather, the outside face of the flange 104b would abut the first and second retaining components 105, 106.

Also shown in FIG. 4 is an O-ring groove 404 formed in the manifold 103. The O-ring groove 404 can retain an O-ring or similar sealing member in order to form a substantially fluid-tight seal with the pipeline (See FIG. 6). In some embodiments, the sealing member may be provided on the pipeline side and thus, the O-ring groove 404 may not be necessary in all embodiments.

Figure 5:
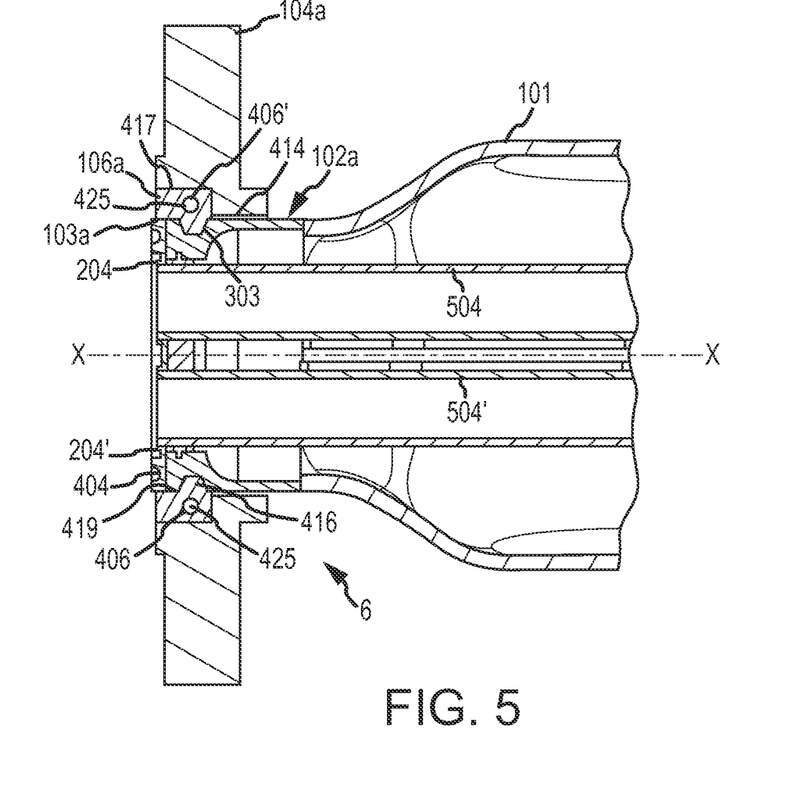
FIG. 5 shows a cross-sectional view of one end of the sensor assembly according to an embodiment.

FIG. 5 shows a cross-sectional view of the first end of the sensor assembly 5 of the fluid meter 100 according to an embodiment. In the discussion that follows, where the same component is shown at the second end, the associated "a" and "b" are dropped from the following discussion. For example, the first end comprises a manifold 103a while the second end comprises a manifold 103b. In the discussion that follows, a manifold 103 is often referred to as both manifolds 103a, 103b are substantially identical.

According to an embodiment, the manifold 103 can be coupled to the fluid tubes 504, 504'. Generally, the manifold 103 is coupled to the fluid tubes 504, 504' via welding. However, other coupling methods may be employed, such as brazing, soldering, adhesives, etc. According to the embodiment shown, the manifold 103 comprises a portion of the wetted fluid path. Consequently, in some situations it may be important to form the manifold 103 of a material also having a high resistance to corrosion. According to an embodiment, the manifold 103 can be formed from a material substantially similar to the material used for the fluid tubes 504, 504'. Therefore, in some embodiments, the manifold 103 may comprise a metal such as titanium, zirconium, or tantalum, for example.

Not only does the substantially similar material used for the manifold 103 provide increased corrosion resistance to the process fluid, but also, the manifold 103 will have a coefficient of thermal expansion that is substantially similar to the coefficient of thermal expansion of the fluid tubes 504, 504', thereby permitting higher temperature coupling techniques, such as welding.

As is generally known, the coefficient of thermal expansion of zirconium is between approximately 5.5-5.9 mm/m/° C.; the coefficient of thermal expansion of tantalum is between approximately 6.3-6.7 mm/m/° C.; and the coefficient of thermal expansion of titanium is approximately 7.0-7.4 mm/m/° C. Those skilled in the art will generally understand that these values may vary based on the purity of the metal and should in no way limit the scope of the description and claims. The values are merely provided as an example. Those skilled in the art will readily recognize how close the coefficient of thermal expansion for the manifold 103 needs to be with respect to the coefficient of thermal expansion for the fluid tubes 504, 504' based on the intended applications.

According to an embodiment, the manifold 103 is also coupled to the transition ring 102 at a first end 302a of the transition ring 102. Typically, the transition ring 102 is coupled to the manifold 103 via brazing. According to one embodiment, the transition ring 102 may be coupled to the manifold 103 by vacuum brazing. Generally, vacuum brazing is carried out by applying a brazing material between the manifold 103 and the transition ring 102. The fluid tubes 504, 504', the manifold 103, and the transition ring 102 are then placed into a vacuum brazing furnace (not shown) that is at a temperature high enough to melt the brazing material, thereby brazing the manifold 103 and the transition ring 102 to one another. Those skilled in the art will recognize that the welded joint between the manifold 103 and the fluid tubes 404, 404' can typically withstand the brazing furnace temperature as the welded joints typically melt at much higher temperatures than experienced in the brazing furnace.

According to the embodiment shown, the transition ring 102 is further coupled to the meter case 101 at the second end 302b. Generally, the transition ring 102 will be coupled to the meter case 101 by a weld joint; however, other methods may be utilized. According to an embodiment, the meter case 101 may comprise a material that is different from the material used to form the manifold 103 and the fluid tubes 504, 504'.

For example, it is common in the industry to utilize 300-series stainless steel for the meter case 101. Therefore, according to an embodiment, the transition ring 102 can couple two dissimilar metals of the sensor assembly 5.

The general coupling between the manifold 103, transition ring 102, and case 101, i.e., the coupling of the sensor assembly body 6, is discussed in greater detail in International Patent Application Number PCT/US 11/59720, which is hereby incorporated by reference for all that it teaches. Therefore, a greater discussion of the coupling between the components is not discussed further.

With the manifold 103, transition ring 102, and case 101 coupled together, a flange 104 can be retained on the sensor assembly 5. As mentioned above, the flange 104 can be used to couple the sensor assembly 5 to a pipeline system. However, the flange provided on the pipeline system can vary depending on the location and size of the pipe. Therefore, it is advantageous to provide a flange, which is removable in order to provide a sensor assembly 5 that is adaptable to various configurations. Furthermore, when the sensor assembly 5 is used in high corrosion situations, the differences in the coefficients of thermal expansion between the flange 104, which is typically 300-series stainless steel, and the transition ring 102 and/or the manifold 103 make welding or brazing the flange 104 undesirable. Welding of the flange 104 to the transition ring 102 and manifold 103 would result in excessive thermal stress being applied to the braze joint between the manifold 103 and the transition ring 102, resulting in premature failure of the joint. Even if the flange 104 were coupled to the case 101, the heat from welding could still jeopardize the integrity of the welded joint between the transition ring 102 and the case 101 and/or the braze joint between the manifold 103 and the transition ring 102. Consequently, the prior art approaches to coupling the flange to the sensor assembly may not be desirable in some situations.

In order to overcome the above-mentioned problems with welding the flange 104 to the sensor assembly housing 6, the present embodiment, uses the two or more retaining components 105, 106 to retain the flange 104 on the sensor assembly 5, but does not couple the flange 104 to the sensor assembly 5. According to the embodiment shown, prior to engaging the retaining components 105, 106 with at least one of the circumferential grooves 303, the flange 104 can be slipped past the circumferential groove 303. In other words, the flange 104 can be positioned closer to the mid-portion of the sensor assembly 5 along the longitudinal axis X-X (to the right of the groove 303 as shown in FIG. 5). As can be appreciated, the flange 104 can only slide past the groove 303 a predetermined distance as the shape of the case 101 enlarges beyond the inner diameter of the step 414. However, as shown, the predetermined distance is far enough beyond the circumferential groove 303 that the lips 415, 416 of the first and second retaining components 105, 106 can be at least partially received by the circumferential groove 303. With the lips 415, 416 engaging the circumferential groove 303, the mechanical fasteners 425 can be used to couple the first and second retaining components 105, 106 together, thereby clamping the retaining components 105, 106 around the circumferential groove 303.

It should be appreciated that while the embodiments describe the mechanical fasteners 425 as only engaging the first and second retaining components 105, 106, in other embodiments, the mechanical fasteners 425 may engage the transition ring 102. For example, the transition ring 102 may include fastener apertures in order to receive the mechanical fasteners 425 after passing through the fastener apertures 405, 405', 406, 406'. Therefore, in some embodiments, the first and second retaining members 105, 106 may be coupled directly to the transition ring 102 rather than being clamped around the transition ring 102.

Additionally, while the embodiment shown has the circumferential groove 303 formed in the transition ring 102, it should be appreciated that the circumferential groove 303 can be formed in any of the components of the sensor assembly body 6. For example, in other embodiments, the circumferential groove 303 could be formed in the manifold 103. In yet another alternative embodiment, the circumferential groove 303 could be formed in the case 101. Some embodiments may include more than one circumferential groove 303 on each end in order to provide multiple flange locations. The particular location of the groove 303 in the sensor assembly body 6 may depend upon an intended configuration of the associated pipeline to which the sensor assembly 5 is going to be coupled.

Once the first and second retaining components 105, 106 are coupled to one another and/or to the transition ring 102, the engagement of the lips 415, 416 with the circumferential groove 303 prevents the retaining components 105, 106 from moving in a direction parallel or perpendicular to the longitudinal axis X-X of the sensor assembly 5. It should be appreciated that in some embodiments, the retaining components 105, 106 may be permitted to rotate about the longitudinal axis X-X.

According to an embodiment, with the first and second retaining components 105, 106 prevented from moving along the longitudinal axis X-X, the flange 104 is securely retained on the sensor assembly 5. As shown, the flange 104 cannot move further left than shown due to the abutment with the retaining components 105a, 106a. More specifically, in the embodiment shown, the step 414 of the flange 104a abuts the retaining components 105a, 106a. Likewise, on the second end, the flange 104b would not be able to move further to the right than allowed by the abutment of the step 414 with the retaining components 105b, 106b. It should be appreciated, that the flange 104 can still move to the right by the predetermined distance, which is determined by the shape and size of the case 101. However, once the flange 104 is coupled to the pipeline system (See FIG. 6), the flange 104 will be prevented from moving away from the position shown in FIG. 5.

It should be appreciated that in some embodiments, the flange 104a may not include the step 414 and rather, the flange may only comprise a single diameter size. However, with the step 414, the larger diameter portion 417 of the flange 104 can at least partially cover the two or more retaining components 105, 106. In some embodiments, the covering of the retaining components 105, 106 can substantially prevent the mechanical fasteners 425 from falling out of the fastener apertures due to vibration and the like. Therefore, the implementation of the step 414 can provide another safety measure to retain the flange 104 on the sensor assembly 5.

Removal of the flange 104 can be performed in substantially the opposite order. Once the flange 104 is decoupled from the pipeline system 600 (See FIG. 6), the flange 104a can move to the right thereby exposing the first and second retaining components 105, 106. The first and second retaining components 105, 106 can be decoupled from one another and lifted out of engagement with the circumferential groove 303. With the first and second retaining components 105, 106 removed from the circumferential groove 303, the flange 104 can be removed from the sensor assembly 5 for maintenance or replacement, for example.

Figure 6:
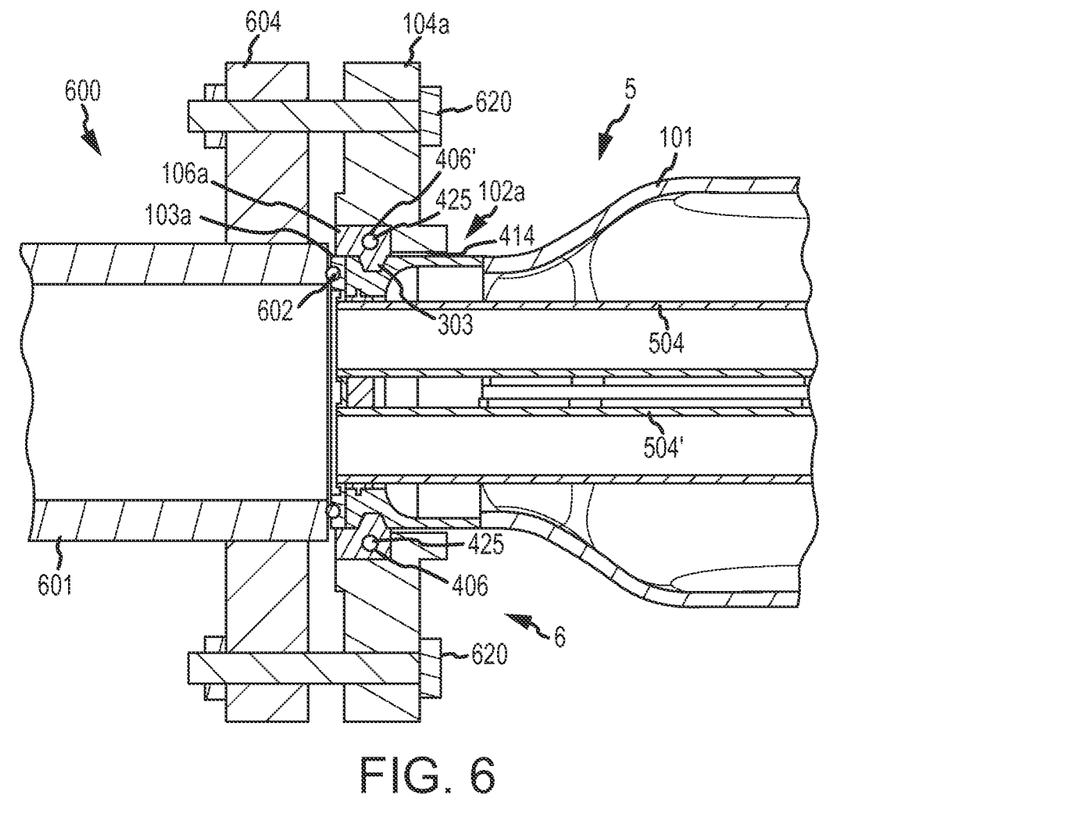
FIG. 6 shows a cross-sectional view of an end of the sensor assembly coupled to a pipeline system according to an embodiment.

FIG. 6 shows a cross-sectional view of the sensor assembly 5 coupled to a pipeline system 600 according to an embodiment. As shown, the sensor assembly 5 is coupled to the pipeline system 600 using the flange 104a. One or more bolts 620 can be used to couple the flange 104a retained on the sensor assembly 5 to the flange 604 of the pipeline system 600. The flange 604 is coupled to a pipe 601. An O-ring 602 is provided in the O-ring groove 404 to form a substantially fluid-tight seal between the pipe 601 and the manifold 103a.

As can be appreciated, the flange 104a is prevented from moving to the left by the first and second retaining components 105, 106 and is prevented from moving to the right due to the bolts 620 engaged with the flange 604. Thus, the flange 104a is securely held in place.

The embodiments described above provide an improved system for retaining a flange 104 on a sensor assembly 5. The system can be utilized where welding of the flange to the sensor assembly 5 could result in premature failure of other coupled joints of the sensor assembly housing 6. The system can also be utilized where a removable flange is desirable. By implementing the two or more retaining components 105, 106, which can be coupled to one another, the embodiments described above overcome the drawbacks associated with split ring designs that are susceptible to accidental slippage of the flange.

The detailed descriptions of the above embodiments are not exhaustive descriptions of all embodiments contemplated by the inventor to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other fluid meters, and not just to the embodiments described above and shown in the accompanying figures. Accordingly, the scope of the embodiments described above should be determined from the following claims.

I claim:

1. A sensor assembly (5) for a fluid meter (100), comprising:
    a sensor assembly body (6);
    one or more circumferential grooves (303) formed in the sensor assembly body (6);
    two or more retaining components (105, 106) removably coupled together and engaging at least one of the one or more circumferential grooves (303);
    one or more threaded mechanical fasteners engaging the two or more retaining components to removably couple the two or more retaining components to one another; and
    a flange (104) surrounding at least a portion of the sensor assembly body (6) and retained around the sensor assembly body (6) by the first and second retaining components (105, 106);
    wherein the two or more retaining components (105, 106) are clamped together around the one or more circumferential grooves (303).

2. The sensor assembly (5) of claim 1, wherein the flange (104) comprises a step (414) extending from an inner surface (417) with a portion of the inner surface (417) extending over the two or more retaining components (105, 106) and the step (414) abutting the two or more retaining components (105, 106).

3. The sensor assembly (5) of claim 1, wherein the sensor assembly body (6) comprises a case (101), a pipeline interface (103), and a transition ring (102) coupling the pipeline interface (103) to the case (101).

4. The sensor assembly (5) of claim 3, wherein the one or more circumferential grooves (303) are formed in the transition ring (102).

5. The sensor assembly (5) of claim 3, further comprising an O-ring groove (404) formed in a face of the pipeline interface (103).

6. The sensor assembly (5) of claim 1, wherein each of the two or more retaining components (105, 106) includes a lip (415, 416) sized and shaped to be received by the circumferential groove.

7. A method for retaining a flange on a sensor assembly, comprising steps of:
 positioning the flange around a portion of a sensor assembly body such that the flange is located closer to a mid-portion of the sensor assembly body than a circumferential groove formed in the sensor assembly body; and
 removably coupling two or more retaining components around the circumferential groove by clamping the two or more retaining components together using one or more retaining components together using one or more threaded mechanical fasteners to provide an outer diameter of a ring that is larger than at least a portion of an inner diameter of the flange, thereby preventing the flange from moving past the two or more retaining components.

8. The method of claim 7, wherein the flange comprises a step extending from an inner surface with a portion of the inner surface extending over the two or more retaining components and the step abutting the two or more retaining components.

9. The method of claim 7, wherein the sensor assembly body comprises a case, a pipeline interface, and a transition ring coupling the pipeline interface to the case.

10. The method of claim 9, wherein the circumferential groove is formed in the transition ring.

11. The method of claim 9, wherein the pipeline interface comprises an O-ring groove.

12. The method of claim 7, wherein each of the two or more retaining components includes a lip sized and shaped to be received by the circumferential groove.

* * * * *